United States Patent

[11] 3,602,947

[72] Inventor Philip R. Morgan
 Monrovia, Calif.
[21] Appl. No. 796,834
[22] Filed Feb. 5, 1969
[45] Patented Sept. 7, 1971
[73] Assignee Morgan Industries, Inc.
 Los Angeles, Calif.

[54] AUTOMATIC CONTROL SYSTEM
 6 Claims, 7 Drawing Figs.
[52] U.S. Cl. .................................................. 18/30 CK,
 18/16 C
[51] Int. Cl. ...................................................... B29f 1/00
[50] Field of Search ........................................... 18/16 C, 30
 CK, 30 CM, 30 CR

[56] References Cited
UNITED STATES PATENTS
2,389,169 11/1945 Stacy ............................ 18/30

3,192,297 6/1965 Gringras ....................... 18/30
3,380,119 4/1968 Beaudry ....................... 18/30

*Primary Examiner*—H. A. Kilby, Jr.
*Attorney*—William P. Green

ABSTRACT: An automatic control system for an injection-molding machine or the like, including a first control valve for admitting actuating fluid to a clamping mechanism, to cause the latter to grip and hold a die or other work unit, and a second valve which is automatically actuable by pressure fluid from the clamping mechanism, when that mechanism reaches its clamping condition, to actuate an injection ram to inject a molding substance into the die. A time-delay unit accumulates pressure fluid within a timing chamber during the injecting portion of the cycle, and automatically returns the first-mentioned valve to closed or off position after a predetermined delay interval sufficient to complete the injection operation.

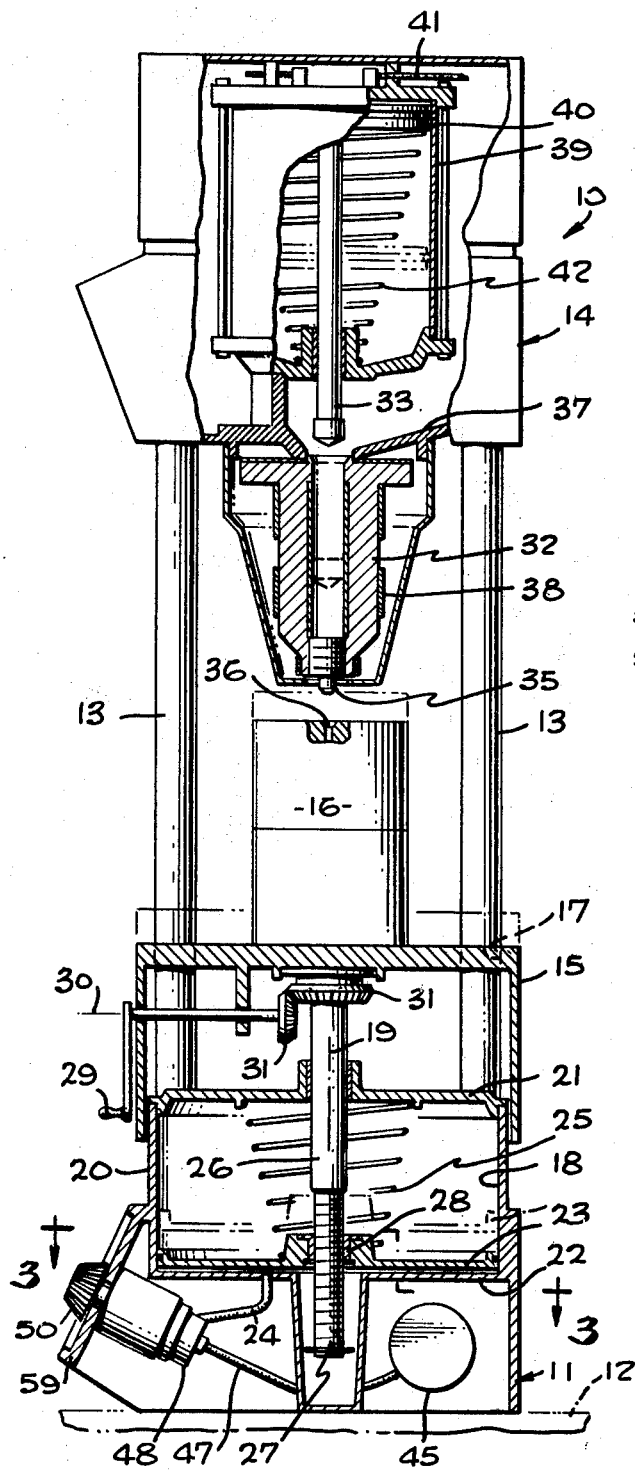
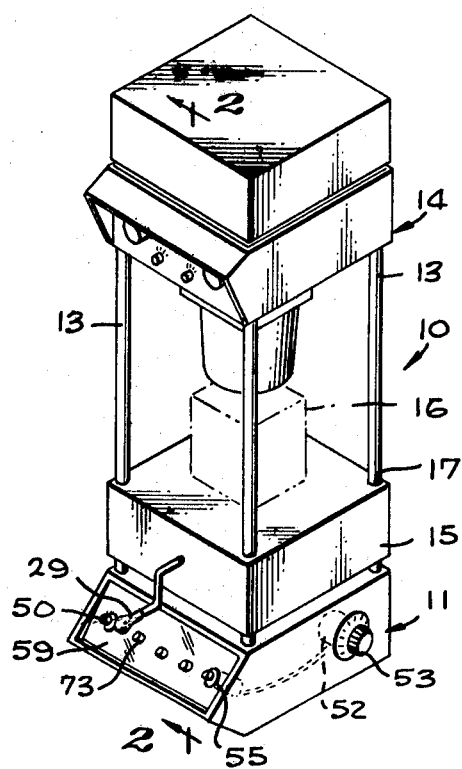
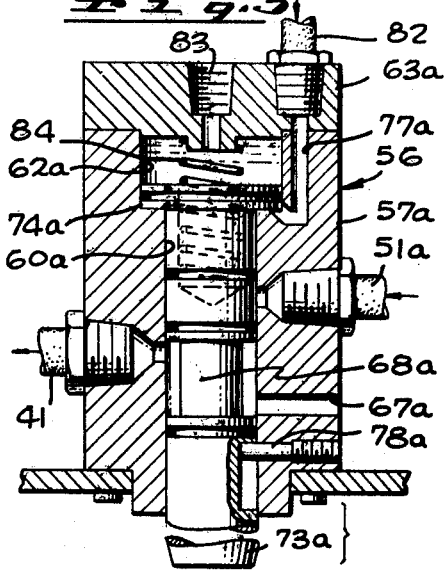
INVENTOR.
PHILIP R. MORGAN
BY
William P. Green
ATTORNEY

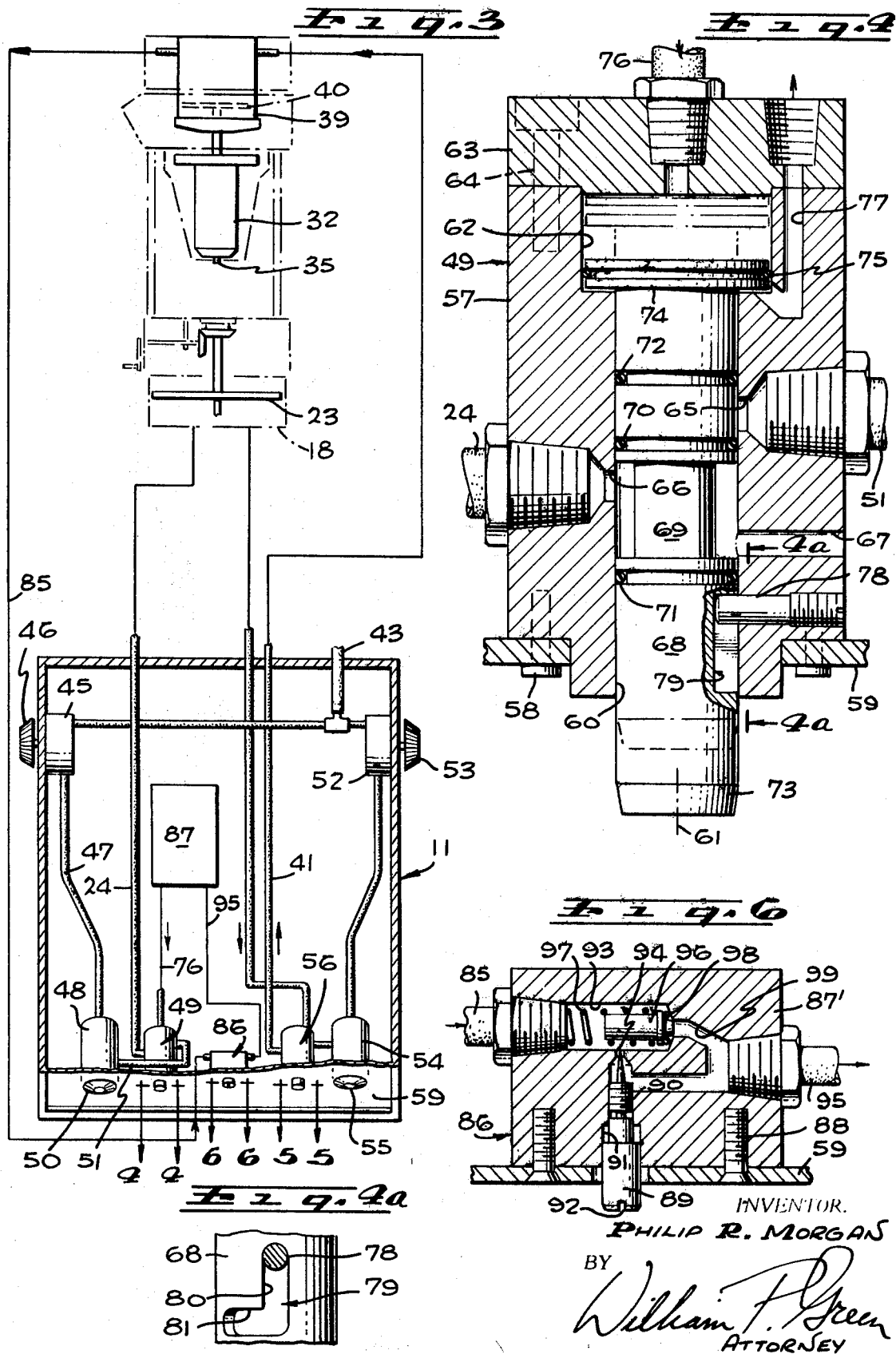

AUTOMATIC CONTROL SYSTEM

CROSS REFERENCE TO RELATED APPLICATION

The present automatic control system is in certain respects especially desirable for controlling the operation of an injection press of the type disclosed and claimed in my copending application Ser. No. 773,736, filed Nov. 6, 1968 on "Injection Molding Machine".

BACKGROUND OF THE INVENTION

The invention relates generally to automatic control systems for sequentially performing two or more operations on a work unit.

In my above-identified prior application, I have disclosed an injection-molding press capable of injecting resinous plastic materials and other substances into a molding die. The preferred form of press shown in the drawings of that application includes a clamping mechanism taking the form of a vertically shiftable table on which a die may be placed, with the table being movable upwardly to clamp the die against an injection nozzle spaced above the table. The table is actuable by a fluid-operated piston and cylinder mechanism, with a second piston and cylinder mechanism functioning to actuate an injection ram, for forcing a molding substance through the nozzle and into the die.

Though the valves for controlling admission of pressure fluid to the two piston and cylinder mechanisms in that apparatus were typically illustrated as manually controlled, there have of course been various other prior injection-molding machines which have been controlled automatically, specifically by the use of conventional electric-timer motors, which have rotated through a predetermined cycle of operation and function to actuate solenoid valves at appropriate times during that cycle. However, the expense of providing such a timer motor and associated solenoid valves is relatively great, and renders the cost of an automatic control system for such an injection-molding machine greater than would be desired, particularly for relatively small machines intended for use in research laboratories, prototyping shops, and the like.

SUMMARY OF THE INVENTION

The control system of the present invention has been devised to enable automatic control of an injection-molding machine or the like with extremely simple and inexpensive control apparatus, and particularly without the necessity for use of a timing motor. As will appear, the control apparatus attains the sequential operation of the two piston and cylinder mechanisms or their equivalents, for first clamping a die and then injecting a molding substance into the die, by provision of two simple valve units, which may be substantially identical in structure, with the first valve unit serving to commence the delivery of actuating fluid to the clamping mechanism, and with the second valve unit being responsive to arrival of the clamping mechanism at its clamping condition to then admit pressure fluid to the injection equipment. The second valve unit may respond to arrival of the clamping mechanism at its clamping condition by sensing an increase in pressure of the actuating fluid which results from the resistance offered by the die to further clamping motion when the mechanism reaches its ultimate clamping condition. In addition to the two valve units, there may be provided a time-delay mechanism which accumulates pressure fluid within a timing chamber, beyond a adjustable restriction valve, during the injecting operation, and which ultimately delivers to the first-mentioned valve unit a pressure sufficient to automatically return it to its original closed or off position after expiration of a delay interval sufficient to enable completion of the injecting step.

It is contemplated that the automatic control system of the present invention may in some of its broader aspects be applicable to equipment usable for purposes other than the performance of an injection-molding operation, in which equipment a work unit other than a molding die may first be clamped by an appropriate clamping mechanism, and then be subjected to the performance of some operation on the work unit other than injection of a molding substance thereinto. The sequential timing of the clamping and subsequent operations could then be controlled by the automatic system of this invention. Also, a unit primarily designed for use as an injection-molding machine and employing the present control system can additionally be adapted for the performance of other auxiliary functions, such as hot- or cold-stamping, or the like, with two sequential operations in each instance being timed by the control system.

Additional features of novelty in the present apparatus reside in the structure of the time-delay chamber and associated restriction valve per se, which timing mechanism may be utilized for other purposes. In conjunction with the adjustable restriction valve, preferably taking the form of a needle valve, I utilize a check valve which permits flow of pressure fluid from the accumulation chamber in a reverse direction past the restriction valve, and in a relatively unrestricted manner, to enable rapid reduction of the pressure in the accumulation chamber at the end of a cycle.

BRIEF DESCRIPTION OF THE DRAWINGS

The above and other features and objects of the invention will be better understood from the following detailed description of the typical embodiment illustrated in the accompanying drawings, in which:

FIG. 1 is a perspective view of an injection-molding press constructed in accordance with the invention;

FIG. 2 is an enlarged vertical section through the press, taken on line 2—2 of FIG. 1;

FIG. 3 is a somewhat diagrammatic representation of the pneumatic control system of the press, with the lower portion of FIG. 3 being taken essentially on line 3—3 of FIG. 2;

FIG. 4 is an enlarged axial section through one of the control valves, taken on line 4—4 of FIG. 3;

FIG. 4a is a fragmentary view taken on line 4a—4a of FIG. 4; and

FIGS. 5 and 6 are sections taken through two additional control valve units, on lines 5—5 and 6—6 respectively of FIG. 3.

DESCRIPTION OF THE PREFERRED EMBODIMENT

With reference first to FIGS. 1 and 3, I have illustrated generally at 10 an injection-molding press or machine constructed basically in accordance with the teachings of my prior application Ser. No. 773,736, and to which the control system of the present invention may be adapted for rendering the press automatic or semiautomatic in its operation. The press may be considered as including a stationary hollow base structure 11 adapted to rest on a suitable support surface 12, and rigidly carrying four parallel vertical cornerposts 13 whose upper ends are rigidly secured to and mount a hollow stationary upper head structure 14. A clamping table 15 has an upper horizontal surface on which an injection-molding die or other work unit 16 is receivable, with the clamping table being mounted and guided for vertical movement relative to base 11 and upper head 14 by extension of cylindrical columns 13 through appropriate closely fitting circular openings or guideways 17 in the table.

The hollow base 11 forms within its interior a pneumatic cylinder chamber 18 centered about a vertical axis 19, and defined by a vertical cylindrical sidewall 20 and top and bottom walls 21 and 22. A piston 23 is movable upwardly within cylinder chamber 18 by compressed air or other pressure fluid introduced into the chamber beneath the piston through an inlet line 24 (FIG. 2), and is returnable downwardly upon release of the pressure by a return spring 25. The piston actuates table 15 vertically through what is in effect a vertical piston rod 26, whose lower portion has external threads 27 engaging internal threads within a nut element 28 rigidly secured to piston 23, so that rotation of the piston rod 26 acts to adjust table 15 vertically relative to piston 23. For effecting such adjustment, rod 26 is adapted to be turned about its vertical axis by manual rotation of a crank handle 29 about a horizontal axis 30, with this crank acting through two bevel gears 31 to turn the piston rod 26 relative to the piston and table 15.

At a location spaced above table 15, the upper head structure 14 of the press stationarily carries a vertical injection cylinder 32 (FIG. 2), centered about the previously mentioned vertical axis 19, and within which an injection ram 33 is movable downwardly, as from the full line position of FIG. 2 to and beyond the broken line position in that figure, to force a heated molding substance, such as a suitable resinous plastic material, downwardly through an injection nozzle 35 and into the injection opening 36 of die 16. The molding material may be filled into a downwardly tapering chute compartment 37 in powder form, and be melted within cylinder 32 by appropriate heater elements 38.

Above the injection cylinder 32 and chute compartment 37, head 14 of the press contains a ram-actuating pneumatic cylinder 39, containing a piston 40 which is movable downwardly along axis 19 by compressed air or other pressure fluid injected into the upper end of the cylinder 39 through an inlet line 41. Piston 40 is rigidly attached to and actuates ram 33, and is returnable upwardly by a coil spring 42.

To now describe the automatic control system of the present invention for actuating pistons 23 and 40 sequentially, reference is made to FIG. 3, the lower portion of which shows the preferred positioning of the various control valves within the hollow base 11 of the press. As seen in FIG. 3, actuating pressure fluid, such as compressed air, is fed into the base through a supply line 43 from an appropriate source of pressure fluid. Some of the pressure fluid from line 43 passes first through a pressure-regulating valve 45, which is actuable to different settings by knob 46 at the outside of the base, to regulate the pressure of air or other pressure fluid delivered into a line 47. This line 47 is connected into the inlet side of a flow-regulating valve 48, which may be constructed the same as the valve 55 shown and described in my prior application Ser. No. 773,736. For present purposes, this valve 48 may be considered simply as a valve offering an adjustable restriction to the flow of pressure fluid from line 47 through valve 48 and to an associated slide valve unit 49, with valve 48 being controlled by a knob or other actuating element 50 accessible from the outside of base 11, and with this valve 48 being adapted in a closed position to automatically vent to atmosphere any pressure remaining in line 51 leading to slide valve unit 49. From slide valve unit 49, pressure fluid may flow through the previously mentioned line 24 into the lower portion of clamping cylinder 18.

In the right-hand portion of the base as seen in FIG. 3, there is provided a second pressure regulator valve 52, receiving compressed air or other desirably compressible pressure fluid from line 43, and adjustable by knob 53 to regulate the pressure of fluid delivered to a second flow-regulating valve 54, which is identical with valve 48, and is adjustable by a control knob 55. From valve 54, the pressure fluid flows through a second slide valve unit 56, which is very similar to unit 49, and from which the fluid passes through the previously mentioned line 41 to the upper end of ram-actuating cylinder 39.

As seen in FIG. 4, the slide valve unit 49 which controls the delivery of pressure fluid to clamping cylinder 18 includes a rigid stationary body 57, appropriately mounted, as by screws 58, to the rear side of a front wall 59 of the base, which wall also carries valves 48, 54 and 56. Valve body 57 contains a cylindrical passage 60 centered about a rearwardly extending axis 61 and communicating with an enlarged diameter concentric rear counterbore or cylinder chamber 62, with a rear cover 63 closing counterbore 62 and being secured to the main body 57 by a number of screws 64. The fluid inlet line 51 leads into bore 60 through a circular opening 65 in the sidewall of the bore, and the pressure fluid discharges from bore 60 into line 24 through a second opening 66 formed in the sidewall of the bore, at a location offset axially from opening 65. A third circular opening 67 in the sidewall of the bore is offset axially in a forward direction from opening 66, and leads to the atmosphere, to exhaust fluid from the bore to the atmosphere under certain conditions.

Within bore 60, there is mounted an axially movable slide valve element 68, which is a close fit within bore 60 except at the location of a reduced-diameter fluid-passing portion 69, located between two annular O-rings 70 and 71 received within appropriate grooves formed in the outer surface of the slide valve element. A third O-ring 72 may be provided within a third groove at a location spaced rearwardly of ring 70. In the full line position of FIG. 4, slide valve element 68 places line 24 in communication with exhaust outlet 67, past reduced-diameter portion 69 of the slide valve element, to exhaust compressed air from the lower portion of clamping cylinder 18; whereas in the broken line position of FIG. 4, the slide valve element passes pressure fluid from inlet line 51 to outlet line 24 of the slide valve element, to pressurize the lower portion of the clamping cylinder and actuate clamping table 15 upwardly. The slide valve element 68 is manually depressible from its full line position of FIG. 4 to its broken line position by pressing inwardly against an exposed pushbutton 73 formed at the outer end of the slide valve element 68.

To automatically return the slide valve element from its broken line position of FIG. 4 to its full line position, the slide valve element carries an enlarged-diameter circular head 74 at its axially inner or rear end, which head functions as a piston having a close fit within cylinder chamber 62, and sealed with respect thereto by an O-ring 75. Compressed air is fed into cylinder chamber 62 rearwardly of its piston 74 through a line 76, which will be discussed in greater detail at a later point. The forward side of piston 74 is communicated to atmosphere through an appropriate vent passage 77. The previously mentioned O-ring 72 forms a seal between air inlet opening 65 and cylinder chamber 62.

In order to enable the slide valve element to be locked in its broken line open position of FIG. 4 for the purpose of permitting completely manual operation of the control system when desired, valve body 57 may carry a locking pin 78, which projects radially inwardly into a bayonet-type notch or slot 79 (FIGS. 4 and 4a). The slot 79 has an axially extending first portion 80 within which pin 78 is received during normal axial movement of the slide valve element, and has a circularly extending essentially transverse second portion 81 within which the pin is received when an operator presses pushbutton 73 inwardly and then turns it with his thumb to lock slide valve element 68 against axially outward movement.

The second slide valve unit 56, which controls the delivery of compressed air to ram-actuating cylinder 39, is essentially very similar to the above discussed first slide valve unit 49, as will be apparent from a review of FIG. 5. More specifically, valve unit 56 includes a body 57a closed at its rear end by a cover 63a, to define a cylindrical bore 60a and an enlarged concentric counterbore 62a corresponding to bore 60 and counterbore 62 of the first valve unit. Slide valve element 68a of unit 56 may be identical with element 68 of unit 49, and serve in the full line position of FIG. 5 to place line 41 and cylinder 39 in communication with exhaust outlet 67a, while in the broken line position of FIG. 5 valve element 68a places line 41 and cylinder 39 in communication with compressed air inlet 51a. An outer pushbutton portion 73a of element 68a is exposed for manual actuation rearwardly, to open valve unit 56, and can be turned by the thumb of the user to lock the valve element 68a in open position by reception of pin 78a within a bayonet slot corresponding to that shown in FIG. 4a.

Instead of being connected to atmosphere, the passage 77a in FIG. 5 is connected by a line 82 to the interior of clamping cylinder 18 at the underside of piston 23. The rear side of piston portion 74a of valve element 68a is vented to atmosphere at 83, with the piston being yieldingly urged forwardly to its full line position of FIG. 5 by a coil spring 84.

The pressure which is present in the upper end of the ram-actuating cylinder 39 (FIGS. 2 and 3) is communicated through a line 85 to a timing-valve unit 86 (FIGS. 3 and 6), which passes the pressure fluid in restricted manner into a timing or accumulation chamber 87 mounted within the interior of the base 11 of the press. The interior of chamber 87 is in turn connected by the previously mentioned lines 76 into slide valve unit 49 (FIGS. 3 and 4), to deliver compressed air thereto for the purpose of returning the slide valve forwardly to its full line position of FIG. 4.

The interior construction of timing-valve unit 86 is brought out in FIG. 6, in which this valve unit is illustrated as including a rigid body 87' mounted by screws 88 to the rear side of the previously mentioned front wall 59 of the base, with a needle valve element 89 being connected threadedly at 90 into a passage 91 in the body and being accessible at its outer end for actuation to different adjusted positions by a screwdriver or other tool engaged within a screwdriver slot 92 in the had of the needle valve. Compressed air flows from line 85 into a second passage or bore 93 extending transversely of passage 91 within body 87, with the air flowing through a small needle valve opening or seat 94 from passage 93 into passage 91, so that adjustment of needle valve element 89 regulates the restriction offered to flow of air between inlet line 85 and outlet line 95 leading to timing chamber 87. Contained within the transverse bore 93, there is provided a check valve element 96, pressed by a spring 97 against a seat 98, in a manner allowing the flow of air from line 95 reversely into line 85 through a bypass passage 99, with very little restriction as compared with the highly restricted path in the other direction past the needle valve. The flow of air permitted through passage 99 is sufficiently rapid to enable very quick discharge of all superatmospheric pressure from chamber 87.

To now describe a cycle of operation of the illustrated apparatus, assume first of all that the press is in the full line position of FIG. 2, and that the two slide valve elements 49 and 56 are in their full line closed positions of FIGS. 4 and 5. If it is desired to then utilize the apparatus for injecting a plastic material or other substance into die 16, the die is placed on table 15 as seen in FIG. 2, and the table is adjusted by crank 29 to a position such as the full line position in FIG. 2 in which the upper surface of the die is spaced only a very short distance beneath injection nozzle 35. The operator then passes slide valve element 68 of FIG. 4 inwardly from its full line position to its broken line position, in which the element is thereafter retained by friction, with this movement serving to admit compressed air from inlet line 51 past slide valve element 68 into line 24 leading to the underside of clamping piston 23. This compressed air actuates the piston upwardly just far enough to move table 15 and die 16 to their broken line positions of FIG. 2, in which the die engages and is clamped tightly upwardly against injection nozzle 35.

The pressure at the underside of piston 23 is communicated by line 82 to the forward side of piston portion 74a of valve element 68a in FIG. 5, and actuates valve element 68a rearwardly to its FIG. 5 broken line position, against the tendency of spring 84, to thereby pass compressed air through valve unit 56 to the upper side of ram-actuating piston 40, in a manner commencing downward movement of the ram 33 for forcing melted plastic or other molding material into the die. It is noted, however, that the pressure at the forward side of piston portion 74a of valve element 68a in FIG. 5 does not reach a great enough value to actuate element 68a to its broken line position, and to overcome the spring 84, until after clamping piston 23 of FIG. 2 has reached its broken line position in which the die 16 is clamped tightly upwardly against nozzle 35. Until the die reaches its position of engagement with injection nozzle 35, there is insufficient resistance offered to the upward movement of piston 23 and the connected parts to develop a sufficient pressure at the underside of piston 23 to actuate slide valve element 68a of FIG. 5 to its broken line or open position. Only when further upward movement of the die is resisted by engagement of the die with injection nozzle 35 does the pressure beneath clamping piston 23 of FIG. 2 reach a value sufficient to overcome spring 84 and actuate slide valve element 68a to its open position, and thereby commence downward movement of ram-actuating piston 40 and the ram in delayed relation to the initiation of the clamping movement of table 15. In a presently preferred arrangement, a pressure corresponding to a 1-ton clamping force against the die is required before valve element 68a of FIG. 5 is actuated.

As soon as valve element 68a is opened to its broken line position of FIG. 5, to commence admission of compressed air through line 41 to the upper end of ram-actuating cylinder 39, this same pressure is communicated from the upper end of cylinder 39 through line 85 to restricted valve unit 86 of FIG. 6, to commence a restricted flow of air past needle valve 89 into accumulation chamber 87. The needle valve is so set as to require a predetermined desired interval before the accumulation of sufficient pressure in chamber 87, as communicated to the forward side of piston portion 74 of valve element 68 (FIG. 4), to cause forward actuation of valve element 68 to its full line FIG. 4 position in a manner closing off the flow of air to the underside of the clamping piston 23. Thus, after a predetermined delay interval following initial opening of valve unit 56 of FIG. 5, the valve element 49 of FIG. 4 is closed to its original full line position. In this position, the pressure at the underside of piston 23 is vented to atmosphere through opening 67 of FIG. 4, to allow downward returning movement of piston 23 and the table 15 and carried die 16. The reduction of pressure at the underside of piston 23 is communicated through line 82 to slide valve unit 56 of FIG. 5, to enable spring 84 to return that slide valve element to its full line position, thus closing off the admission of pressure fluid to the upper end of ram-actuating cylinder 39, and venting the upper portion of that cylinder as well as accumulation chamber 87 to atmosphere through opening 67a of FIG. 5. The discharging of chamber 87 to atmosphere can be effected very rapidly by automatic opening of check valve element 96 of FIG. 6, to thereby return all of the apparatus to its original condition in preparation for the next cycle of operation.

Adjustment of the flow-controlling valves 48 and 54 of FIG. 3 will regulate the rate at which actuating air can be admitted to the two cylinders 18 and 29, to thereby control the rate of operation of the contained pistons. Also if it is desired on a particular occasion to operate the apparatus completely manually, rather than in the discussed automatic or semiautomatic fashion, the two pushbutton slide valve elements 68 and 68a may be pressed inwardly and turned to their locked-open positions, following which the admission of air to the cylinders 18 and 39 may be controlled entirely by manual actuation of the two flow-controlling valves 48 and 54. If at any time it becomes desirable to operate the ram 33 without corresponding actuation of the clamping table, as for instance in flushing any remaining plastic or other molding substance from the injection equipment, this may be effected by pressing pushbutton valve element 68a inwardly without corresponding actuation of the other pushbutton element 68. Further, the apparatus may also obviously be adapted for performing other operations rather than an injection-molding operation as a secondary portion of the cycle following clamping, with any such secondary step being controlled by valve unit 56 in the same manner in which the ram-actuating piston is controlled in the illustrated apparatus.

I claim:

1. Injection-molding apparatus comprising a vertically movable clamping table for receiving and supporting a molding die, an injection nozzle spaced above said table, a first piston and cylinder mechanism for actuating said table upwardly to clamp said die between the table and nozzle, a ram for forcing a molding substance through said nozzle into the die, a second piston and cylinder mechanism for actuating said ram, a first slide valve which is axially movable manually to an open position and acts when so moved to pass pressure fluid to said first piston and cylinder mechanism, a second slide valve responsive to attainment of a predetermined pressure in said first piston and cylinder mechanism to pass pressure fluid to said second piston and cylinder mechanism to force said molding substance into said die, a timing chamber receiving pressure fluid from said second valve, a restricting valve adjustably restricting the flow of said pressure fluid to said chamber, and means for communicating pressure fluid from said chamber to said first valve in a relation to return the latter to closed position upon delayed attainment of a predetermined pressure in the chamber.

2. Injection-molding apparatus as recited in claim 1, including a check valve permitting relatively unrestricted reverse flow of pressure fluid from said chamber past said restricting valve, each of said slide valves having an end exposed as a pushbutton for manual actuation thereof, there being bayonet slot means for locking said slide valves in open position, and three being additional valves for adjustably regulating the flow of pressure fluid to said two piston and cylinder mechanisms through said two slide valves respectively when the latter are locked in open position.

3. Apparatus comprising clamping means for gripping and holding a work unit and adapted to be actuated to clamping condition by pressure fluid, valve means for admitting pressure fluid to said clamping means with the pressure of said fluid at said clamping means automatically increasing upon arrival of the latter at said clamping condition, additional means for performing a predetermined operation on said work unit while the latter is held by said clamping means, and control means responsive to said increase in pressure of said fluid upon arrival of the clamping means at said clamping condition to then automatically actuate said additional means to perform said predetermined operation, said additional means being actuable by pressure fluid, said control means including a slide valve actuable by said increase in pressure at said clamping means to admit actuating fluid to said additional means, there being means for releasably locking said slide valve in open position for passing fluid to said additional means, and means for regulating the delivery of fluid to said additional means when the slide valve is locked in open position.

4. Apparatus comprising clamping means for gripping and holding a work unit and adapted to be actuated to clamping condition by pressure fluid, valve means for admitting pressure fluid to said clamping means with the pressure of said fluid at said clamping means automatically increasing upon arrival of the latter at said clamping condition, additional means for performing a predetermined operation on said work unit while the latter is held by said clamping means, and control means responsive to said increase in pressure of said fluid upon arrival of the clamping means at said clamping condition to then automatically actuate said additional means to perform said predetermined operation, said control means including second valve means operable to pass actuating fluid to said additional means upon attainment of said increase in pressure at said clamping means, a timing chamber for receiving fluid from said second valve means, and means responsive to pressure in said chamber to return said first valve means to a closed position upon attainment of a predetermined pressure in the chamber.

5. Apparatus as recited in claim 4, in which said control means include means for adjustably restricting the flow of pressure fluid into said chamber from said second valve means.

6. Apparatus as recited in claim 5, including a check valve for permitting relatively unrestricted reverse flow of pressure fluid from said chamber past said restricting means.